United States Patent
Oide et al.

(10) Patent No.: US 10,661,634 B2
(45) Date of Patent: May 26, 2020

(54) HEATER DEVICE

(71) Applicant: DENSO CORPORATION, Kariya, Aichi-pref. (JP)

(72) Inventors: Hiroyasu Oide, Kariya (JP); Hideaki Kako, Kariya (JP); Kimitake Ishikawa, Kariya (JP); Hideki Seki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 298 days.

(21) Appl. No.: 15/566,488

(22) PCT Filed: Mar. 17, 2016

(86) PCT No.: PCT/JP2016/058598
§ 371 (c)(1),
(2) Date: Oct. 13, 2017

(87) PCT Pub. No.: WO2016/167075
PCT Pub. Date: Oct. 20, 2016

(65) Prior Publication Data
US 2018/0297449 A1 Oct. 18, 2018

(30) Foreign Application Priority Data
Apr. 15, 2015 (JP) .................. 2015-083577

(51) Int. Cl.
*B60H 1/22* (2006.01)
*H05B 1/02* (2006.01)
*B60H 1/00* (2006.01)

(52) U.S. Cl.
CPC ......... *B60H 1/2218* (2013.01); *B60H 1/2215* (2013.01); *B60H 1/2226* (2019.05);
(Continued)

(58) Field of Classification Search
CPC .............. B60H 1/2218; B60H 1/00742; B60H 1/2226; B60H 1/00207; B60H 2001/2246; B60H 2001/2259; B60H 2001/2265; B60H 2001/2287; B60H 2001/00228; B60H 2001/2228; H01B 1/0236
See application file for complete search history.

(56) References Cited

U.S. PATENT DOCUMENTS

2008/0181456 A1 7/2008 Aoki et al.
2008/0231221 A1 9/2008 Ogawa
(Continued)

FOREIGN PATENT DOCUMENTS

JP 2008162376 A 7/2008
JP 2008229800 A 10/2008
(Continued)

*Primary Examiner* — Steven B McAllister
*Assistant Examiner* — Daniel E. Namay
(74) *Attorney, Agent, or Firm* — Harness, Dickey & Pierce, P.L.C.

(57) ABSTRACT

A heater device includes: a distance specifying portion that specifies a distance between a sensing subject, i.e., an occupant and a heater main body as a sensed distance; and a moving mechanism that moves the heater main body. The heater device further includes a heater position control portion that controls the moving mechanism such that the distance between the sensing subject, i.e., the occupant and the heater main body is adjusted to a target distance based on the sensed distance, which is specified by the distance specifying portion.

21 Claims, 7 Drawing Sheets

(52) U.S. Cl.
CPC . *H05B 1/0236* (2013.01); *B60H 2001/00228* (2013.01); *B60H 2001/2246* (2013.01); *B60H 2001/2259* (2013.01); *B60H 2001/2265* (2013.01); *B60H 2001/2287* (2013.01)

(56) References Cited

U.S. PATENT DOCUMENTS

| | | |
|---|---|---|
| 2009/0008974 A1 | 1/2009 | Hattori et al. |
| 2010/0176110 A1 | 7/2010 | Ogino et al. |
| 2016/0039265 A1 | 2/2016 | Ota et al. |

FOREIGN PATENT DOCUMENTS

| | | |
|---|---|---|
| JP | 2009050522 A | 3/2009 |
| JP | 2010052710 A | 3/2010 |
| JP | 2011011610 A | 1/2011 |
| JP | 2011031839 A | 2/2011 |
| JP | 2013060200 A | 4/2013 |
| JP | 2014190674 A | 10/2014 |
| WO | WO-2014155915 A1 | 10/2014 |

POSITIVE TEMPERATURE COEFFICIENT PROPERTY
(PTC PROPERTY)

HEATER DEVICE

CROSS REFERENCE TO RELATED APPLICATION

This application is based on and incorporates herein by reference Japanese Patent Application No. 2015-83577 filed on Apr. 15, 2015.

TECHNICAL FIELD

The present disclosure relates to a heater device that includes a heater unit, which radiates a radiant heat.

BACKGROUND ART

Previously, there is known a heating device that includes: a planar electric heater; a front surface member, which is placed at a front surface of the electric heater and has a relatively high thermal conductivity; and a back surface member, which is placed at a back surface of the electric heater and has a relatively low thermal conductivity (see, for example, the patent literature 1). This heating device is provided at a glove box, which is an openable and closable storage portion disposed in front of a front passenger seat in a vehicle cabin. When the glove box is pulled to place the glove box in an open state, the heating device is placed close to lower limbs of a person who is seating on the front passenger seat.

CITATION LIST

Patent Literature

PATENT LITERATURE 1: JP2010-52710A

SUMMARY OF INVENTION

However, the heating device, which is recited in the patent literature 1, is constructed such that a position of the heater is fixed in the state where the glove box is placed in the open state. Therefore, a distance between the body of the occupant and the heater varies depending on the body size of the occupant, the posture of the occupant, and the seat position. Therefore, the heating device, which is recited in the patent literature 1, may have a disadvantage of that the occupant cannot have good warm sensation, or a disadvantage of that the efficient heater control cannot be executed.

The present disclosure is made in view of the above disadvantages. Thus, it is an objective of the present disclosure to enable an occupant of a vehicle to have good warm sensation without relying on a body size of the occupant, a posture of the occupant and/or a seat position and also to enable efficient heater control.

In order to achieve the above objective, according to one aspect of the present disclosure, a heater device includes: a heater main body that includes a heater unit, which generates heat; and a distance specifying portion that specifies a distance between a sensing subject and the heater main body as a sensed distance. The heater device further includes: a moving mechanism that moves the heater main body; and a heater position control portion that controls the moving mechanism such that the distance between the sensing subject and the heater main body is adjusted to a target distance based on the sensed distance, which is specified by the distance specifying portion.

In this heater device, the distance between the sensing subject and the heater main body is specified as the sensed distance, and the moving mechanism is controlled such that the distance between the sensing subject and the heater main body is adjusted to the target distance based on the sensed distance. In this way, the distance between the sensing subject and the heater main body is adjusted to the target distance, so that the occupant can have good warm sensation without relying on the body size of the occupant, the posture of the occupant and/or the seat position, and the efficient heater control can be executed.

DESCRIPTION OF EMBODIMENTS

Hereinafter, various embodiment of the present disclosure will be described with reference to the accompanying drawings. In the following respective embodiments, portions, which have previously described in a previous embodiment(s), will be indicated by the same reference signs and may not be redundantly described for the sake of simplicity. In the following respective embodiments, if only a portion of a structure is described, a description of the rest of the structure, which has been previously described in another embodiment, may be applied to the rest of the structure.

First Embodiment

Figure 1:
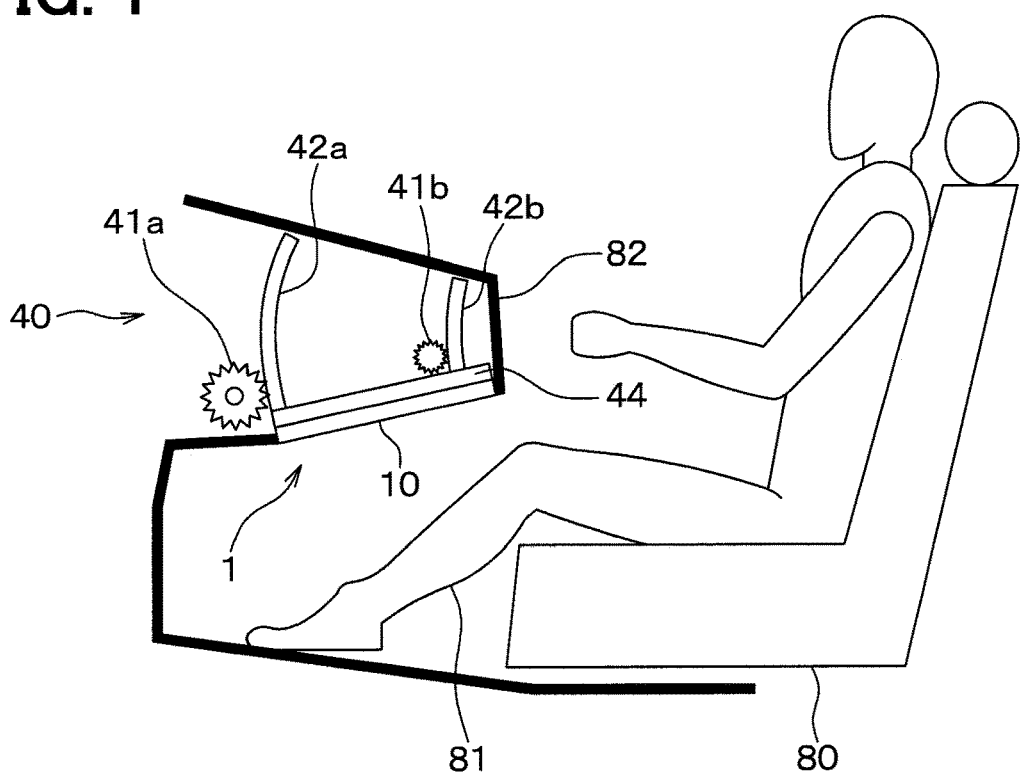
FIG. 1 is a diagram indicating a positional relationship between a heater device and an occupant according to a first embodiment of the present disclosure.

A structure of a heater device 1 according to a first embodiment of the present disclosure will be described with reference to FIGS. 1 to 8. FIG. 1 is a diagram indicating a positional relationship between the heater device 1 and an occupant of a vehicle. The heater device 1 is installed in, for example, a road traveling vehicle. The heater device 1 is an electric heater that generates a heat when an electric power is received from an electric power source, such as a battery or an electric generator installed on the vehicle. The heater device 1 includes a heater main body 10, which is shaped into a thin plate form, and a moving mechanism 40, which moves the heater main body 10. The heater device 1 radiates a radiant heat in a direction that is perpendicular to a surface of the heater device 1 to heat a heating subject that is positioned in a direction perpendicular to the surface of the heater device 1.

A seat 80, on which the occupant 81 seats, is placed in a vehicle cabin. The heater device 1 is installed in the vehicle cabin to radiate the radiant heat toward legs of the occupant 81. The heater device 1 of the present embodiment is installed to a glove box 82 of the vehicle.

The moving mechanism 40 is installed to left and right side surface portions in an inside of the glove box 82. The moving mechanism 40 moves the heater main body 10 by a pair of rack-and-pinion mechanisms that are placed at the left and right sides, respectively. The moving mechanism 40 includes a plurality of primary pinion gears 41a, a plurality of primary rack gears 41b, a plurality of secondary pinion gears 42a and a plurality of secondary rack gears 42b. Each of the primary rack gears 41b is meshed with a corresponding one of the primary pinion gears 41a, and each of the secondary rack gears 42b is meshed with a corresponding one of the secondary pinion gears 42a. In the present embodiment, the number of the primary pinion gears 41a, the number of the primary rack gears 41b, the number of the secondary pinion gears 42a and the number of the secondary rack gears 42b are set to be two, and the two primary pinion gears 41a, the two primary rack gears 41b, the two secondary pinion gears 42a and the two secondary rack gears 42b are respectively placed at the left and right side surface portions in the inside of the glove box 82.

A support member 44, which is shaped into a plate form and supports the heater main body 10, is installed to one ends of the primary rack gears 41b and one ends of the secondary rack gears 42b. The heater main body 10 is fixed to one surface side of the support member 44.

Figure 8:
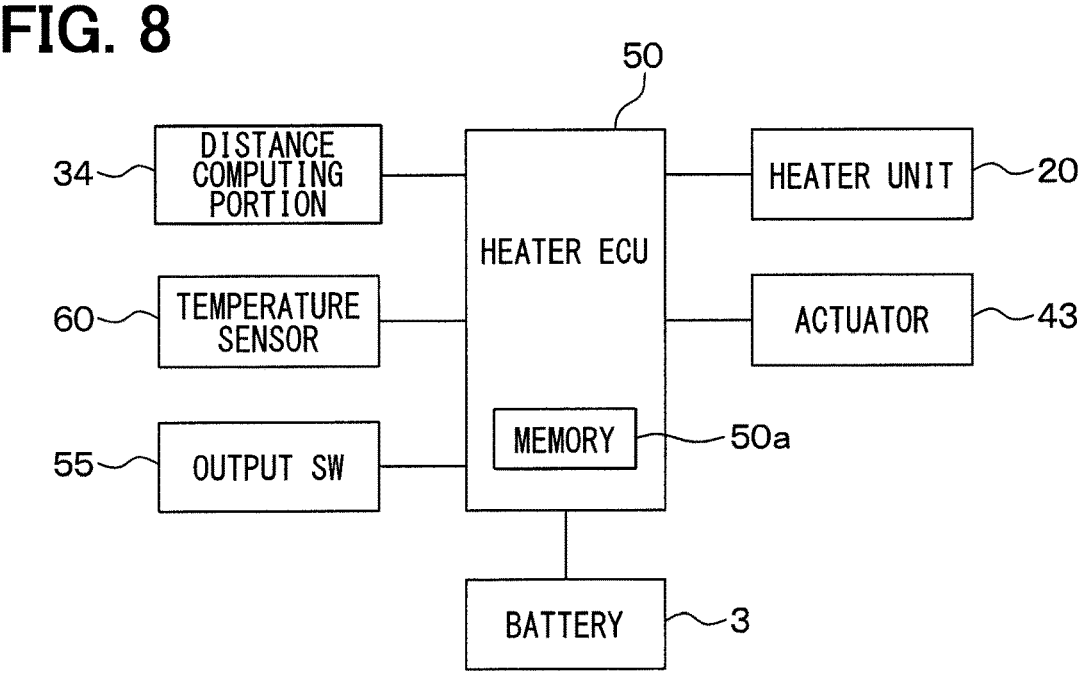
FIG. 8 is a block diagram of the heater device according to the first embodiment.

A rotatable shaft of the respective primary pinion gears 41a is fixed to a rotatable shaft of an actuator 43, which is shown in FIG. 8 and will be described later. The primary pinion gears 41a are rotated in response to rotation of the actuator 43.

When the primary pinion gears 41a are rotated by the actuator 43, the primary rack gears 41b makes a slide movement. The secondary rack gears 42b make a slide movement in response to the sliding of the primary rack gears 41b.

Figure 2:
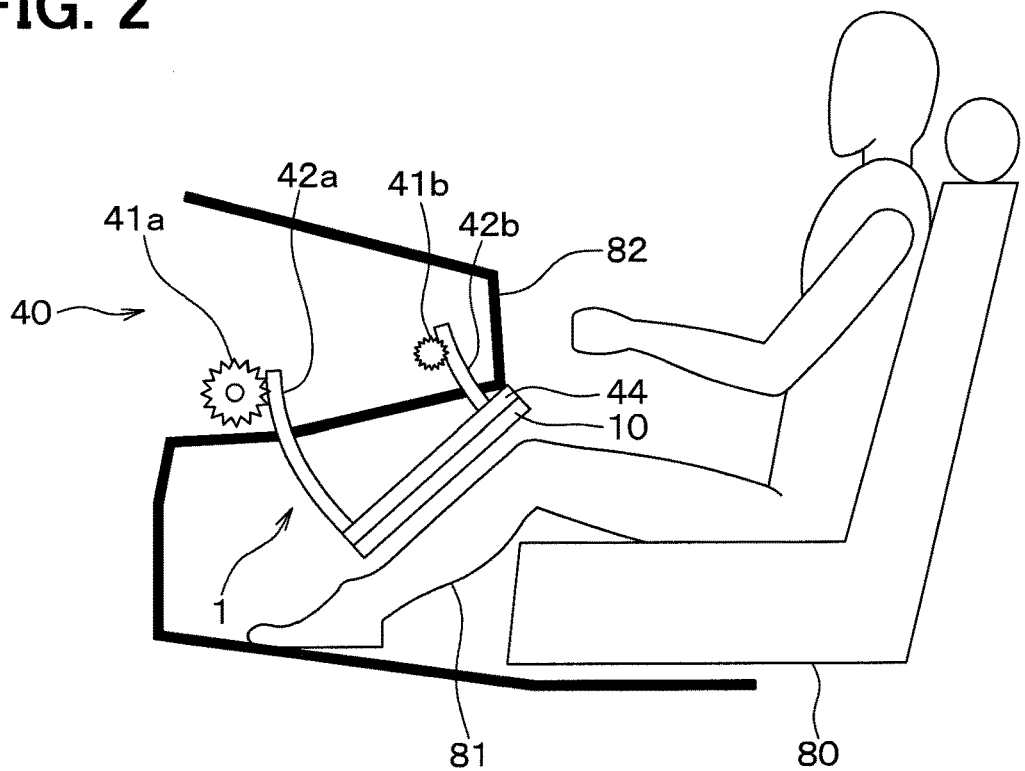
FIG. 2 is a diagram indicating a positional relationship between the heater device and the occupant when a heater main body is moved.

As shown in FIG. 1, the heater main body 10 is stored at a storing position, which is placed at a lower surface of the glove box 82. As shown in FIG. 2, the heater main body 10 is moved toward the occupant side in response to the sliding movements of the primary pinion gears 41a and the secondary rack gears 42b upon the rotation of the actuator 43. The moving mechanism 40 is constructed to move the heater main body 10 such that the heater main body 10 is placed generally parallel to lower limbs of the occupant.

Figure 3:
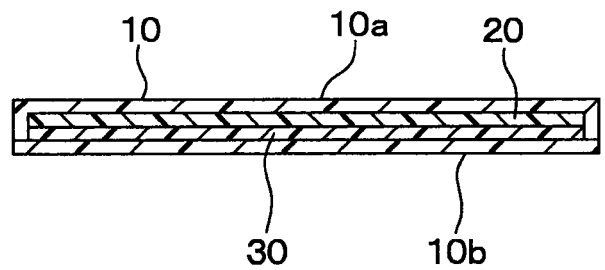
FIG. 3 is a cross-sectional view of the heater main body of the heater device according to the first embodiment.

As shown in FIG. 3, the heater main body 10 is shaped into a thin plate form. The heater main body 10 includes a heater unit 20, a distance sensing layer 30, a case 10a and an upholstery 10b. The heater unit 20 radiates the radiant heat. The distance sensing layer 30 serves as a distance specifying portion that senses a position of the sensing subject. The case 10a receives the heater unit 20 and the distance sensing layer 30. The upholstery 10b covers an opening portion of the case 10a. The heater unit 20 and the distance sensing layer 30 are stacked one after another in an inside of the case 10a. The upholstery 10b is made of a resin material that is resistant to a high temperature.

Figure 4:
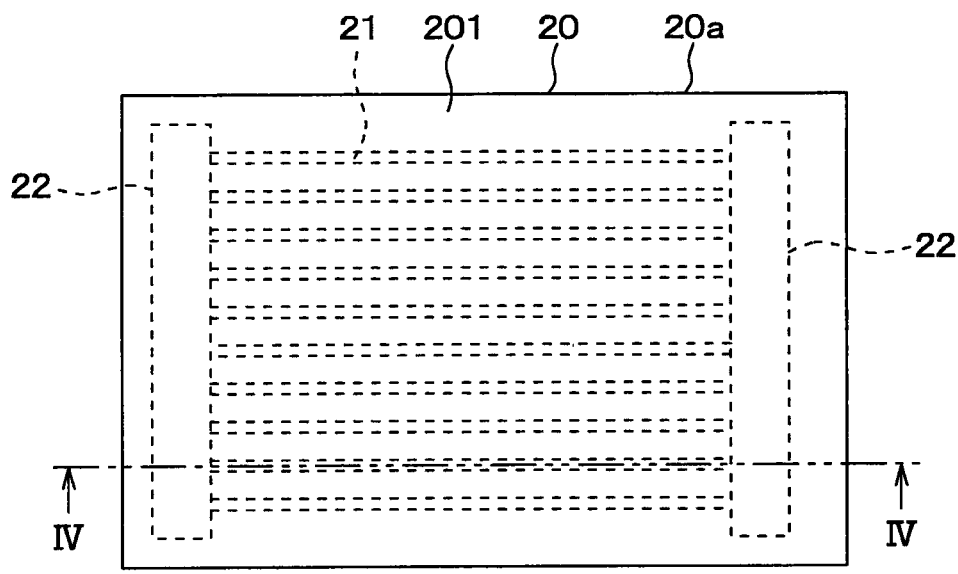
FIG. 4 is a plan view of a heater unit of the heater main body.
Figure 5:
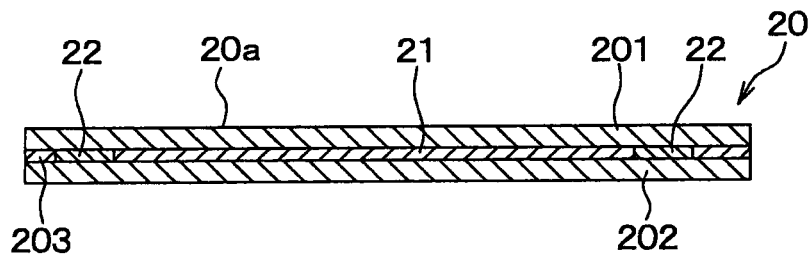
FIG. 5 is a cross-sectional view of a heater unit of the heater main body.

Next, a structure of the heater unit 20 will be described with reference to FIGS. 4 and 5. As shown in FIG. 4, the heater unit 20 is shaped into a thin plate form that has a generally rectangular shape. The heater unit 20 includes a substrate 20a, which is made of dielectric resin, a plurality of heat generating portions 21, and a pair of terminals 22, which are electrical conductors. The heater unit 20 may be also referred to as a planar heater that radiates the radiant heat in a direction that is perpendicular to the surface thereof.

The substrate 20a is made of a resin material that can provide a good electric insulation property and can withstand a high temperature. The substrate 20a is a multi-layer substrate. The substrate 20a includes a front surface layer 201, a back surface layer 202 and an intermediate layer 203. The front surface layer 201 faces a radiating direction of the radiant heat. In other words, the front surface layer 201 is a surface that is opposed to a portion of the occupant 81, which is a heating subject, in an installed state of the heater unit 20. The back surface layer 202 forms a back surface of the heater unit 20. The intermediate layer 203 supports the heat generating portions 21 and the terminals 22. The substrate 20a is a member that supports the heat generating portions 21, each of which is in a wire form. The front surface layer 201, the back surface layer 202 and the intermediate layer 203 are dielectric portions made of a material that has a lower thermal conductivity in comparison to the heat generating portions 21 and the terminals 22. For example, the front surface layer 201, the back surface layer 202 and the intermediate layer 203 are made of polyimide resin.

Each of the heat generating portions 21 is made of a material that generates a heat upon energization thereof. The heat generating portions 21 may be made of a metal material. For example, the heat generating portions 21 may be made of copper, silver, tin, stainless steel, nickel or Nichrome. Each of the heat generating portions 21 is in the wire form or plate form that is parallel to a surface of the substrate 20a. The heat generating portions 21 are spread over the surface of the substrate 20a.

Each of the heat generating portions 21 is connected to the pair of terminals 22, which are spaced from each other by a predetermined distance. The heat generating portions 21 are placed between the pair of terminals 22 such that the heat generating portions 21 are spaced from each other. The heat generating portions 21 are connected in parallel relative to the pair of terminals 22 such that the heat generating portions 21 bridge between the pair of terminals 22, and the heat generating portions 21 are arranged throughout a substantially whole extent of the surface of the substrate 20a. The heat generating portions 21 and the intermediate layer 203 are held between the front surface layer 201 and the back surface layer 202. The heat generating portions 21 are protected from an outside by the substrate 20a.

The heat generating portions 21 are members that are thermally coupled to at least the front surface layer 201 and generate heat through energization thereof. Thereby, the heat, which is generated by the heat generating portions 21, is conducted to the front surface layer 201. The heat, which is generated by one of the heat generating portions 21, is radiated from the front surface layer 201 to the outside after conducted through the member(s), such as the substrate 20a, and is supplied to the occupant 81 who is opposed to the front surface layer 201.

The heat generating portions 21 are set to have a predetermined length to obtain a predetermined calorific value. Therefore, each of the heat generating portions 21 is set to have a predetermined value of resistance. Furthermore, a size and a shape of each of the heat generating portions 21 are set such that a thermal resistance of the heat generating portion 21 in a lateral direction becomes a predetermined value. In this way, when a predetermined voltage is applied to the heat generating portions 21, the heat generating portions 21 generate a predetermined calorific value. The heat generating portions 21 generate the predetermined calorific value, and thereby the temperature of the heat generating portions 21 is raised to a predetermined temperature. The heat generating portions 21, which have reached the predetermined temperature, heat the front surface layer 201 to a predetermined radiation temperature. Thus, the heater unit 20 can radiate the radiant heat, which gives warmth feeling to the occupant 81, i.e., a human.

Next, a structure of the distance sensing layer 30 of the present embodiment will be described with reference to FIGS. 6 and 7. The distance sensing layer 30 is a capacitive sensor that senses a distance relative to an object around the heater unit 20 based on a change in a capacitance thereof. The distance sensing layer 30 includes a dielectric substrate 31, a plurality of electrodes 32a and a plurality of electrodes 32b.

The dielectric substrate 31 is made of a resin material that has a good electrical insulating property. Furthermore, although not depicted in FIG. 6, as shown in FIG. 7, the distance sensing layer 30 includes a base film 33. The base film 33 is made of a resin material that provides a good electrical insulating property and can withstand the high temperature. The base film 33 may be made of, for example, polyimide or polyester.

Figure 6:
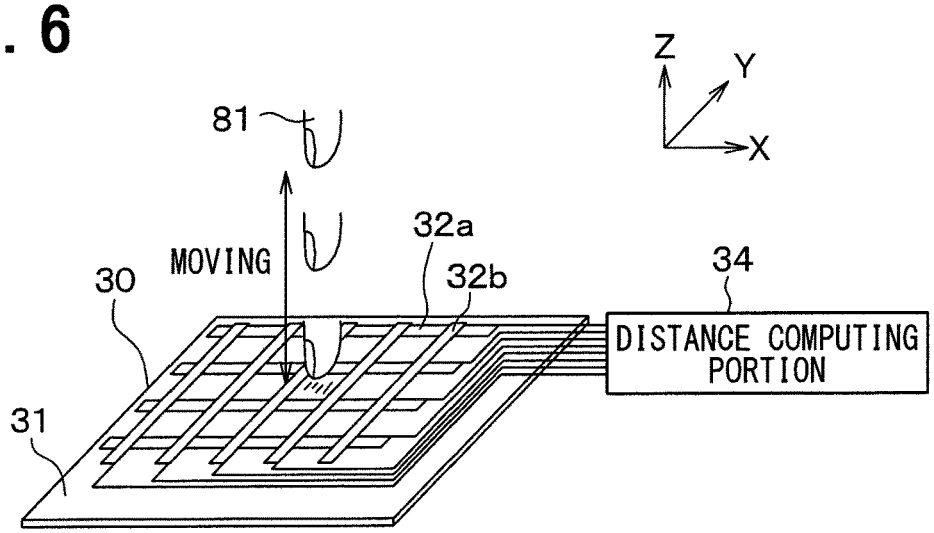
FIG. 6 is a diagram indicating a structure of a distance sensing layer of the heater main body.
Figure 7:
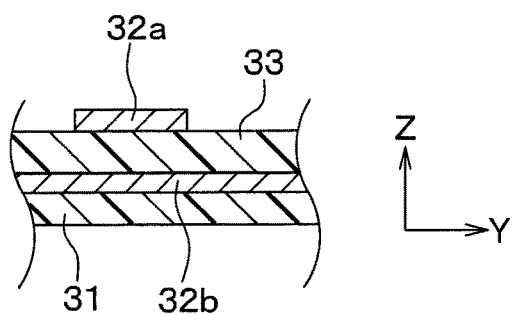
FIG. 7 is a cross-sectional view of the distance sensing layer.

Among three mutually perpendicular coordinate axes, i.e., an axis X, an axis Y, and an Axis Z shown in FIGS. 6 and 7, the electrodes 32a are formed to extend in a direction of the axis X at one surface side of the base film 33. Furthermore, the electrodes 32b are formed to extend in a direction of the axis Y at the other surface side of the base film 33. The electrodes 32a, 32b may be made of an electrically conductive metal material, such as copper.

A distance computing portion 34 applies a predetermined voltage between the electrodes 32a and the electrodes 32b. When the predetermined DC voltage is applied to the electrodes 32a and the electrodes 32b, a potential difference is generated between the electrodes 32a and the electrodes 32b. Here, in a case where an object is absent at the heater unit 20, a value of capacitance between the electrodes 32a and the electrode 32b does not change. However, when the body of the occupant 81 approaches the heater unit 20 and blocks lines of electric force between the electrodes 32a and electrodes 32b, the value of capacitance between the electrodes 32a and the electrodes 32b changes. The distance computing portion 34 specifies a distance between the heater unit 20 and the object around the heater unit 20 based on the change in the value of capacitance between the electrodes 32a and the electrodes 32b.

Next, a block configuration of the heater device 1 will be described with reference to FIG. 8. The heater device 1 includes the distance computing portion 34, a temperature sensor 60, an output switch 55, a manipulating portion 52, the heater unit 20 and a heater ECU 50.

The temperature sensor 60 is placed at a center part of the heater unit 20. The temperature sensor 60 outputs a signal, which corresponds to the temperature of the heater unit 20, to the heater ECU 50.

As discussed above, the distance computing portion 34 specifies the distance between the heater unit 20 and the object (i.e., the sensing subject) around the heater unit 20 based on the change in the value of capacitance between the electrodes 32a and the electrodes 32b installed to the distance sensing layer 30. This object is the occupant. The distance computing portion 34 is formed as an IC, i.e., a distance sensing integrated circuit.

Furthermore, in a case where a plurality of different objects (a plurality of different sensing subjects) approaches a plurality of regions around the heater unit 20, the distance computing portion 34 can specify a distance to each of the objects in association with a plane position of the object. This plane position is surface coordinates.

When presence of the sensing subject in a proximity sensing range is sensed, the distance computing portion 34 outputs proximity sensing information and distance information to the heater ECU 50. The proximity sensing information indicates that the sensing subject is sensed in the proximity sensing range. The distance information indicates the specified distance between the heater unit 20 and the sensing subject around the heater unit 20.

The heater ECU 50 is a control device that controls that operation of the heater unit 20. The heater ECU 50 can control, for example, the output, the temperature, and the calorific value of the heater unit 20. Therefore, the heater ECU 50 can change the amount of radiant heat, which is applied to the occupant 81. When the heater ECU 50 starts the electric power supply to the heater unit 20 through a terminal V1, the surface temperature of the heater unit 20 is rapidly increased to the predetermined radiation temperature, which is controlled. Therefore, even in the winter season, the occupant 81 can rapidly feel the warmth.

In a case where the object contacts the front surface layer 201 of the heater unit 20, the heat, which is conducted from the heat generating portions 21 to the front surface layer 201, is rapidly conducted to the object that is in contact with the front surface layer 201. Therefore, the temperature of the contacted portion of the front surface layer 201 is rapidly decreased. Thus, the surface temperature of the portion of the heater unit 20, which is in contact with the object, is rapidly decreased. The heat of the portion, which is in contact with the object, is conducted to the object and is spread in the object. Therefore, it is possible to limit an excessive increase in the surface temperature of the object, which is in contact with the heater unit 20.

Figure 9:
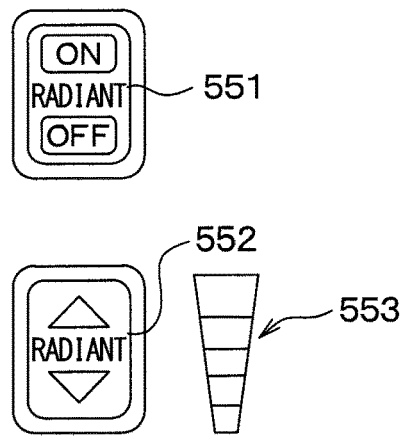
FIG. 9 is a diagram for describing an on-off switch and a level setting switch of an output switch.

A signal, which is outputted from the output switch 55, is inputted to the heater ECU 50. As shown in FIG. 9, the output switch 55 includes an on-off switch 551 and a level setting switch 552. The on-off switch 551 is for commanding start or stop of the electric power supply to the heat generating portion 21. The level setting switch 552 is for setting the output level of the heat generating portions 21.

The on-off switch 551 includes an ON-button for commanding the start of the electric power supply to the heat generating portions 21 and an ON-button for commanding the stop of the electric power supply to the heat generating portion 21. When the ON-button of the on-off switch 551 is manipulated by the occupant, the heater ECU 50 starts the electric power supply to the heat generating portions 21. In contrast, when the OFF-button of the on-off switch 551 is manipulated by the occupant, the heater ECU 50 stops the electric power supply to the heat generating portions 21.

The level setting switch 552 is an output level manipulating portion. Specifically, when a level-up switch or a level-down switch of the level setting switch 552 is manipulated by the occupant, the level setting switch 552 sets a corresponding output level of the heat generating portions 21 and commands the set output level to the heater ECU 50. At the level setting switch 552, for example, the output level can be set to one of multiple levels such that the set output level is indicated by a lighting length of an indicator 553. Alternatively, the output level may be set to one of three levels, i.e., "high," "middle," and "low" through manipulation of the level setting switch 552. Further alternatively, the level setting switch 552 may be a dial type level adjusting device that can change a level value through rotation of a knob.

The heater ECU 50 is constructed to execute a computing process and a control process in a state where a DC electric power is supplied to the heater ECU 50 from a battery (serving as an in-vehicle electric power source) 3, which is installed to the vehicle, regardless of ON and OFF of an ignition switch that executes start and stop of the engine. The heater ECU 50 can supply the electric power, which is received from the battery 3, to the heater unit 20, and the heater ECU 50 can control this electric power supplied to the heater unit 20. The heater ECU 50 can control the output of the heat generating portions 21 by controlling this electric power supplied to the heater unit 20.

The heater ECU 50 includes a microcomputer that has functions of a CPU, i.e., a central processing unit that executes the computing process and the control process, a memory 50*a*, such as a ROM and/or a RAM, and an I/O port, i.e., an input/output circuit. A signal, which is outputted from the temperature sensor 60, is inputted to the microcomputer after an A/D conversion upon transmission of the signal through the I/O port or an A/D converter circuit. The heater ECU 50 computes a target heater temperature of the heater main body 10 based on the setting of the level setting switch 552 and executes a feedback control operation such that the temperature of the heater main body, which is sensed with the temperature sensor 60, approaches this target heater temperature. The heater ECU 50 controls the electric power supply to the heater unit 20 through a pulse signal. Specifically, the heater ECU 50 controls the amount of electric power supplied to the heater unit 20 by changing a duty ratio of the pulse signal that is outputted from the heater ECU 50 to the heater unit 20. The duty ratio is a ratio between a period of a periodic pulse waveform and a pulse width.

The memory 50*a*, such as the ROM and/or the RAM, forms a storage device of the heater ECU 50. The memory 50*a* stores, for example, a map in advance. The map is used to compute a moving amount (i.e., a target moving amount) of the heater main body 10, which is required to shift a distance between the sensing subject and the heater main body 10 to a preset target distance. This sensing subject is, for example, the occupant.

This map indicates a relationship among: a target heater output of the heater unit 20, i.e., a target heater temperature of the heater unit 20; a sensed distance between the heater main body 10 and the sensing subject; and a heater moving amount of the heater main body 10, i.e., a target heater moving amount. In this map, the heater moving amount of the heater main body 10, i.e., the target heater moving amount is defined such that the distance between the sensing subject and the heater main body 10 is kept to a constant distance. Furthermore, in this map, the distance between the sensing subject and the heater main body 10 changes depending on the target heater output of the heater unit 20, i.e., the target heater temperature of the heater unit 20. Specifically, the distance between the sensing subject and the heater main body 10 is reduced when the target heater output of the heater unit 20 is increased. This map is used in a heater control process executed by the heater ECU 50.

Figure 10:
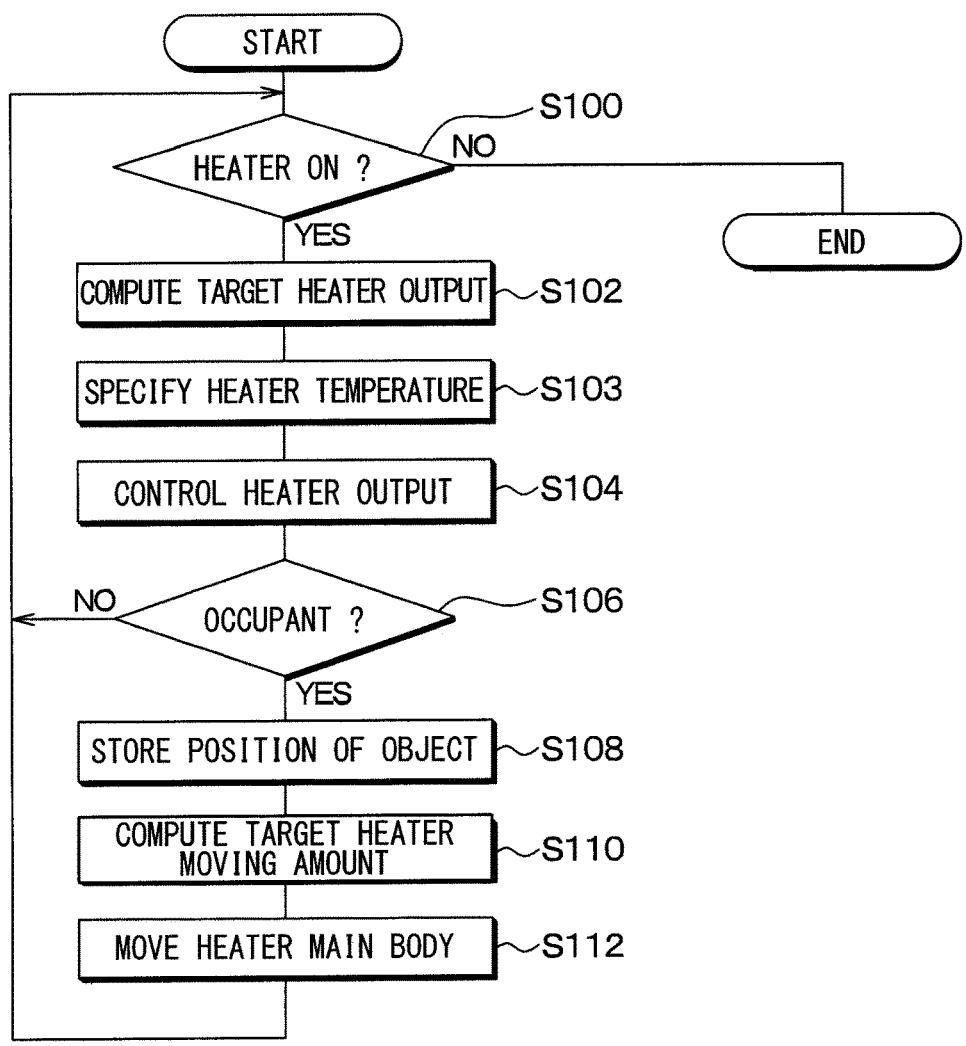
FIG. 10 is a flowchart of a heater ECU according to the first embodiment.

FIG. 10 shows a flowchart of this heater control process. The heater ECU 50 periodically executes the process shown in FIG. 10. Here, it should be noted the control steps in flowcharts of the attached drawings form corresponding function implementing portions, respectively, of the heater ECU 50.

First of all, at S100, the heater ECU 50 determines whether the ON-button of the on-off switch 551 is manipulated. Here, in a case where the ON-button of the on-off switch 551 is manipulated, a result of the determination at S100 becomes YES. Thereby, at S102, the ECU 50 computes the target heater output, i.e., the target heater temperature based on the set heater output level. Specifically, the heater ECU 50 computes the target heater output, i.e., the target heater temperature of the heater unit 20 based on the setting of the level setting switch 552 through use of an equation(s), which is stored in advance in the memory 50*a* of the heater ECU 50.

At next S103, the heater ECU 50 specifies the heater temperature of the heater main body 10. This heater temperature can be specified based on the signal, which is inputted from the temperature sensor 60.

At next step S104, the heater ECU 50 executes a heater output control operation. In the present embodiment, first of all, the target heater output, i.e., the target heater temperature of the heater unit 20 is specified such that the temperature of the heater unit 20, which is specified at S103, approaches the target heater temperature, which is computed at S102. Then, a pulse signal having a corresponding duty ratio, which can achieve the target heater output, is outputted to the heater unit 20.

For example, in a case where the temperature of the heater unit 20, which is specified at S103, is sufficiently lower than the target heater output, i.e., the target heater temperature, which is computed at S102, the duty ratio becomes approximately equal to 1 (i.e., ≈1). Furthermore, when a difference between the target heater output, i.e., the target heater temperature, which is computed at S102, and the temperature of the heater unit 20, which is specified at S103, is reduced, the duty ratio is reduced and approaches 0 (zero).

At next S106, it is determined whether the object is sensed. Specifically, it is determined whether the object is sensed in the proximity sensing range of the distance sensing layer 30 based on a proximity sensing signal, which is outputted from the distance computing portion 34. This object is the occupant.

Here, in a case where the occupant is present in the proximity sensing range of the distance sensing layer 30, and thereby YES is returned at S106, the result of the determination at S106 becomes YES. Thus, at next S108, the specified position of the occupant is stored in the RAM of the heater ECU 50. Specifically, the distance between the heater main body 10 and the occupant is specified as a sensed distance based on the distance information, which is outputted from the distance computing portion 34, and this specified sensed distance is stored in the RAM of the heater ECU 50. In a case where there is specified a plurality of sensed distances, which are respectively sensed at a plurality of locations for the heater unit 20 and the body of the occupant, based on the distance information outputted from the distance computing portion 34, the plurality of sensed distances at the plurality of locations is stored in the RAM of the heater ECU 50. In such a case, the shortest distance may be used as the sensed distance between the heater main body 10 and the occupant.

At next step S110, the heater ECU 50 computes the heater moving amount of the heater main body 10, i.e., the target heater moving amount of the heater main body 10, which is required to adjust the sensed distance between the sensing subject, i.e., the occupant and the heater main body 10 to the preset target distance. Specifically, the moving amount of the heater main body 10, i.e., the target moving amount of the heater main body 10 is computed based on the target heater output, which is specified at S104, and the position of the sensing subject, i.e., the distance between the heater main body 10 and the sensing subject, which is specified at S108, through use of the map stored in the memory 50a of the heater ECU 50.

In the present embodiment, in the case where the target heater output of the heater unit 20 is constant, the moving amount of the heater main body 10, i.e., the target moving amount of the heater main body 10, which is required to keep the distance between the sensing subject, i.e., the occupant and the heater main body 10, is computed. Furthermore, in the present embodiment, the moving amount of the heater main body 10, i.e., the target moving amount of the heater main body 10 is computed in such a manner that the distance between the sensing subject and the heater main body 10 changes depending on the target heater output of the heater unit 20. Specifically, the moving amount of the heater main body 10, i.e., the target moving amount of the heater main body 10 is computed such that when the target heater output of the heater unit 20 is increased, i.e., when the target heater temperature of the heater unit 20 is increased, the distance between the sensing subject and the heater main body 10 is reduced.

Next, at S112, the heater ECU 50 controls the moving mechanism 40 such that the moving mechanism 40 moves the heater main body 10. Specifically, the heater ECU 50 drives the actuator 43 of the moving mechanism 40 such that the actuator 43 moves the heater main body 10 based on the target heater moving amount, which is computed at S110. Thereafter, the heater ECU 50 stops the actuator 43 of the moving mechanism 40. In this way, the heater main body 10 is stopped at a corresponding position, at which the distance between the heater main body 10 and the occupant reaches the predetermined distance.

By repeating the above operation, in a case where, for example, a posture of the occupant is changed, or the occupant changes a seat position, the moving mechanism 40 is controlled such that the sensed distance between the heater main body 10 and the occupant reaches the target distance in conformity with, for example, the posture of the occupant. Then, the sensed distance between the heater main body 10 and the occupant is kept to the target distance.

When the occupant is out of the proximity sensing range of the distance sensing layer 30 by getting off the vehicle, the determination at S106 becomes NO. Therefore, the operation returns to S100.

Furthermore, when the occupant manipulates the OFF-button of the on-off switch 551, the determination at S100 becomes NO. Therefore, the present operation is terminated.

With the above structure, the moving mechanism 40, which moves the heater main body 10, is provided. The distance between the sensing subject and the heater main body 10 is specified as the sensed distance. Then, based on this sensed distance, the moving mechanism 40 is controlled such that the distance between the sensing subject and the heater main body reaches the target distance. Thereby, the distance between the sensing subject and the heater main body 10 reaches the target distance. Thus, the occupant can have good warm sensation without relying on the body size of the occupant, the posture of the occupant and/or the seat position, and the efficient heater control can be executed.

Furthermore, the target heater output of the heater unit 20 is specified based on the predetermined heater output level, and the moving mechanism 40 is controlled such that the distance between the sensing subject and the heater main body is changed based on this target heater output.

Specifically, the moving mechanism 40 is controlled such that the distance between the sensing subject and the heater main body 10 is reduced when the target heater output is increased, and vice versa. With this construction, for example, when the occupant increases the heater output level, it is possible to quickly provide the warm sensation to the occupant.

There is provided the memory 50a that stores the map indicating the relationship among the target heater output, the sensed distance between the heater main body 10 and the sensing subject, and the heater moving amount of the heater main body that is moved by the moving mechanism. Therefore, the heater moving amount of the heater main body can be easily obtained based the target heater output, and the sensed distance between the heater main body 10 and the sensing subject.

Second Embodiment

Figure 12:
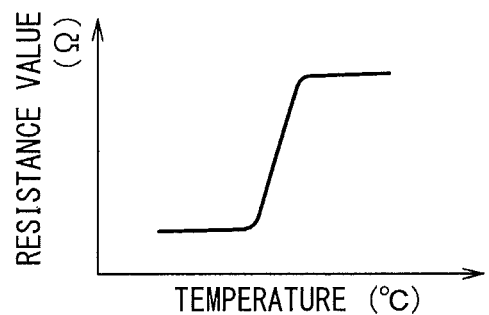
FIG. 12 is a diagram for describing a positive temperature coefficient of a PTC layer.
Figure 13:
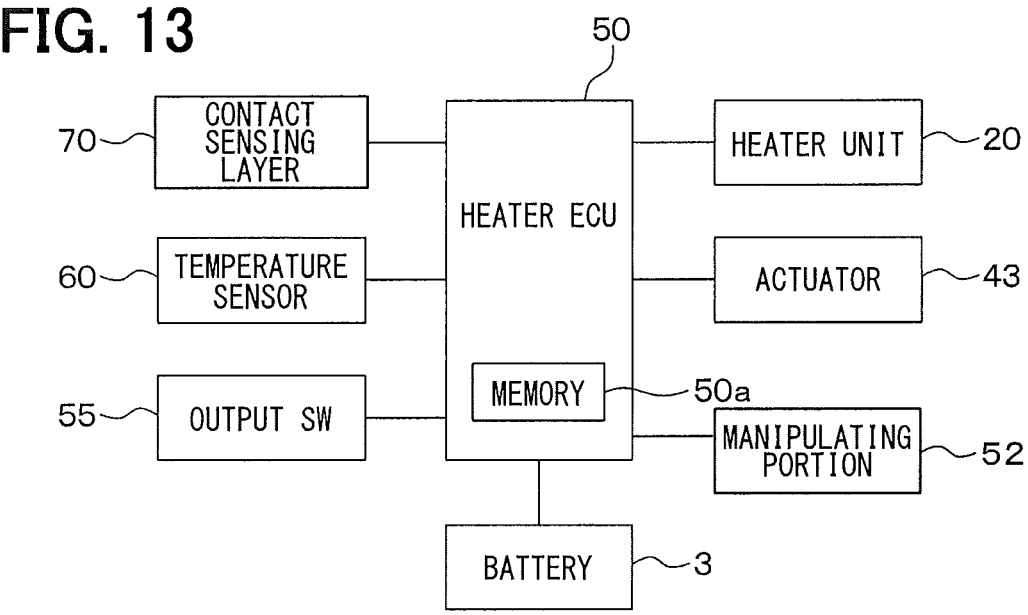
FIG. 13 is a block diagram of the heater device according to the second embodiment.

A structure of the heater device 1 according to a second embodiment of the present disclosure will be described with reference to FIGS. 11 to 13. In the heater device 1 of the first embodiment, the distance specifying portion is formed by the distance sensing layer 30. In contrast, in the heater device 1 of the present embodiment, the distance specifying portion is formed by a contact sensing layer 70 in place of the distance sensing layer 30. Furthermore, the heater ECU 50 of the present embodiment is configured to receive a seat belt fastening signal, which is outputted from a seat belt sensor (not shown) and indicates weather a seat belt of the occupant is fastened, and abnormality signals, which are outputted from various ECUs of the vehicle and notify an abnormality of the vehicle. The abnormality of the vehicle may be, for example, a brake abnormality or vehicle collision.

The contact sensing layer 70 serves as a contact sensing portion, which senses contact between the heater main body 10 and the sensing subject, and also serves as a distance sensing portion, which senses a distance between the heater main body 10 and the sensing subject. Specifically, when the contact sensing layer 70 senses the contact between the heater main body 10 and the sensing subject, it is possible to sense the distance between the heater main body 10 and the sensing subject as 0 (zero).

Figure 11:
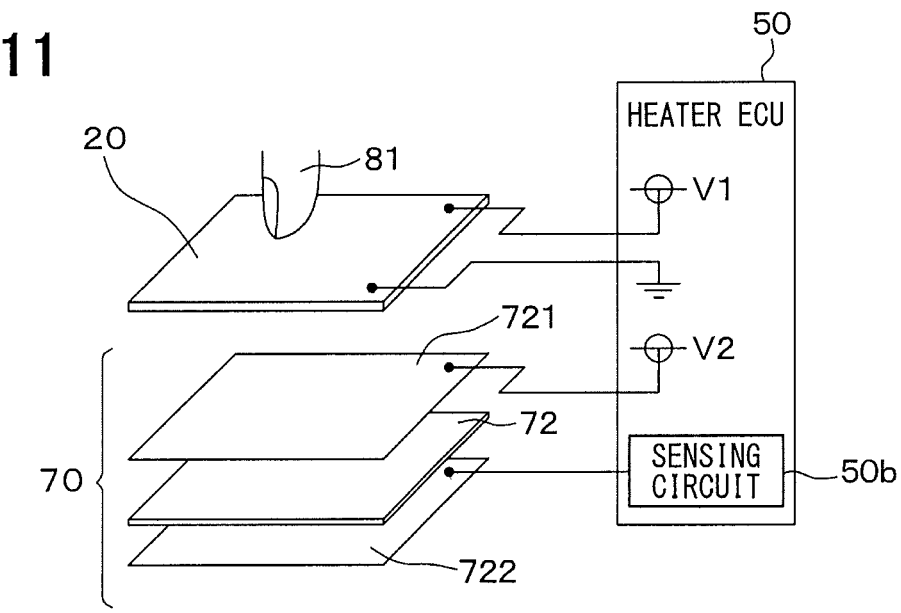
FIG. 11 is a diagram showing a structure of a heater device according to a second embodiment.

As shown in FIG. 11, the contact sensing layer 70 includes a PTC layer 72, an electrode plate 721 and an electrode plate 722. FIG. 11 indicates as if there are a space between the heater unit 20 and the electrode plate 721, a space between the electrode plate 721 and the PTC layer 72, and a space between the PTC layer 72 and the electrode plate 722. However, in reality, the heater unit 20, the electrode plate 721, the PTC layer 72 and the electrode plate 722 are stacked one after another.

The PTC layer 72 is made of a positive temperature coefficient member, i.e., a resistor, which has a PTC property. The PTC layer 72 is in a thin plate form. The PTC stands for Positive Temperature Coefficient. The PTC layer 72 has the following PTC property. Specifically, as shown in FIG. 12, when the temperature is low, a value of resistance of the PTC layer 72 is small. When the temperature is increased and reaches a predetermined temperature, i.e., a Curie point, the value of resistance of the PTC layer 72 is rapidly increased.

Each of the electrode plate 721 and the electrode plate 722 is made of an electrically conductive member and is shaped into a thin plate form. The electrode plate 721 and the electrode plate 722 are arranged such that the PTC layer 72 is interposed between the electrode plate 721 and the electrode plate 722.

The electrode plate 721 is connected to a power supply terminal V2 of the heater ECU 50 through a connecting line, and the electrode plate 722 is connected to a sensing circuit 50b of the heater ECU 50 through a connecting line. A constant voltage (e.g., 5V) is applied between the electrode plate 721 and the electrode plate 722.

The sensing circuit 50b of the present embodiment outputs a corresponding voltage that corresponds to an electric current that flows between the electrode plate 721 and the electrode plate 722. The heater ECU 50 determines whether an object contacts the heater unit 20 based on the voltage that is outputted from the sensing circuit 50b.

The heater unit 20 of the heater device 1 according to the present embodiment has the same structure as that of the heater device 1 of the first embodiment. That is, when the body of the occupant 81 contacts the front surface layer 201 of the heater unit 20, the heat, which is conducted from the heat generating portion 21 to the front surface layer 201, is rapidly conducted to the body of the occupant 81, which is in contact with the front surface layer 201 of the heater unit 20. Therefore, the temperature of the contacted portion of the front surface layer 201 is rapidly decreased. Thus, the surface temperature of the portion of the heater unit 20, which is in contact with the body of the occupant 81, is rapidly decreased. The heat of the portion, which is in contact with the body of the occupant 81, is conducted to the body of the occupant 81 and is spread in the body of the occupant 81. Therefore, it is possible to limit an excessive increase in the surface temperature of the body of the occupant 81, which is in contact with the heater unit 20.

The heater unit 20 of the heater main body 10 of the present embodiment is constructed such that even in the case where the sensed temperature of the temperature sensor 60 becomes equal to or higher than 100 degrees Celsius, when the body of the occupant contacts the surface of the heater unit 20, the temperature of contacted portion of the heater unit 20 is decreased to, for example, 40 degrees Celsius.

Furthermore, the heater main body 10 includes the contact sensing layer 70 that includes the PTC layer 72. In a case where the temperature is higher than the predetermined temperature, i.e., the Curie temperature, the value of resistance of the PTC layer 72 becomes large, so that the electric current does not flow between the electrode plate 721 and the electrode plate 722. Thus, the voltage, which is outputted from the sensing circuit 50b, becomes 0 volts.

Furthermore, when the temperature of the contacted portion of the heater unit 20 is decreased upon contacting of the body of the occupant to the contacted portion of the heater unit 20, the temperature of an adjacent portion of the contact sensing layer 70, which is adjacent to the contacted portion of the heater unit 20, is also decreased. When the temperature of the adjacent portion of the contact sensing layer 70, which is adjacent to the contacted portion of the heater unit 20, becomes lower than the predetermined temperature, i.e., the Curie temperature, the electric current flows between the electrode plate 721 and the electrode plate 722 through the adjacent portion of the PTC layer 72. Therefore, the voltage, which corresponds to the electric current that flows between the electrode plate 721 and the electrode plate 722, is outputted from the sensing circuit 50b. The heater ECU 50 determines whether the object contacts the heater unit 20 based on the voltage that is outputted from the sensing circuit 50b.

The heater ECU 50 includes an abnormality sensing portion (not shown) that senses an abnormality of the heat generating portion 21 of the heater unit 20 (e.g., abnormal heat generation, breaking of a conductive line, sensing of a noise). The heater ECU 50 executes a process of abnormality determination of the heater main body 10 based on whether the abnormality of the heat generating portion 21 is sensed with this abnormality sensing portion.

Figure 14:
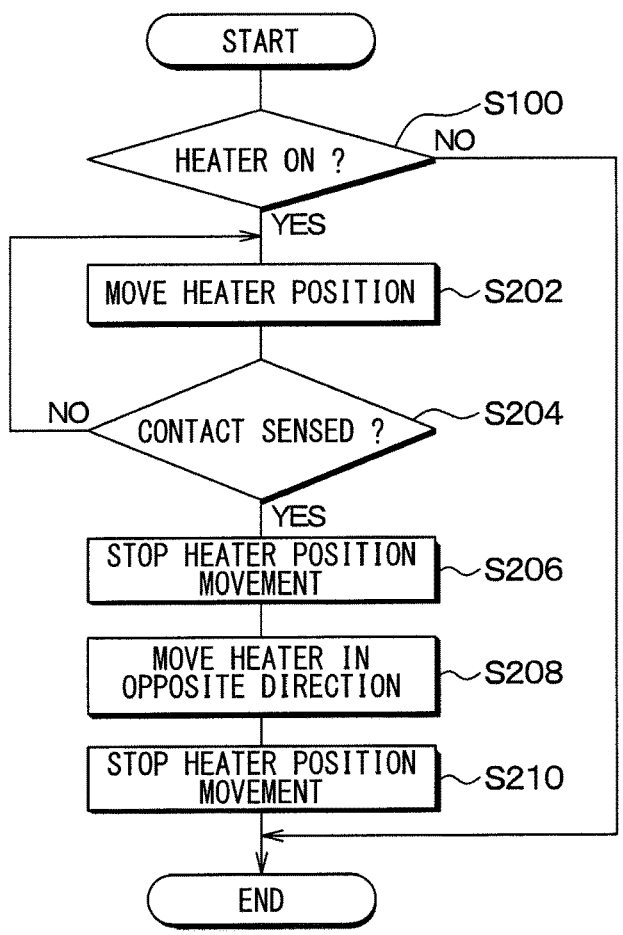
FIG. 14 is a flowchart of a heater ECU according to the second embodiment.

FIG. 14 is a flowchart of the heater ECU 50 of the present embodiment. The heater ECU 50 of the present embodiment periodically executes the process of FIG. 14.

First of all, at S100, the heater ECU 50 determines whether the ON-button of the on-off switch 551 is manipulated. Here, in the case where the ON-button of the on-off switch 551 is manipulated by the occupant, the result of the determination at S100 becomes YES. Therefore, at next step S202, the heater ECU 50 moves the heater main body 10 toward the occupant. Specifically, the heater ECU 50 drives the actuator 43 of the moving mechanism 40 such that the moving mechanism 40 moves the heater main body 10 toward the occupant.

At next S204, the heater ECU 50 determines whether the contact between the heater main body 10 and the occupant is sensed. Specifically, it is determined whether the heater unit 20 contacts the occupant based on the voltage that is outputted from the sensing circuit 50b.

In a case where the heater main body 10 does not contact the occupant, a result of the determination at S204 becomes NO. Thereby, the operation returns to S202 where the heater ECU 50 maintains the movement of the heater main body 10 toward the occupant.

Furthermore, when the heater main body 10 contacts the occupant, the result of the determination at S204 becomes YES. Thereby, the operation proceeds to S206 where the heater ECU 50 stops the movement of the heater main body 10. Specifically, the driving of the actuator 43 of the moving mechanism 40 is stopped.

At next S208, the heater ECU 50 controls the moving mechanism 40 in such a manner that the heater main body 10 is moved in an opposite direction that is opposite from the previous moving direction of the heater main body 10. Specifically, the actuator 43 of the moving mechanism 40 is rotated in an opposite rotational direction that is opposite from the previous rotational direction of the actuator 43, so that the heater main body 10 is moved in the direction for spacing the heater main body 10 away from the occupant by a predetermined distance.

At next S210, the heater ECU 50 stops the movement of the heater main body 10. Specifically, the driving of the actuator 43 of the moving mechanism 40 is stopped, and the present operation is terminated. In this way, the heater main body 10 is stopped at the location where the distance between the heater main body 10 and the occupant becomes the predetermined distance.

Furthermore, when the occupant manipulates the OFF-button of the on-off switch 551, the result of the determination at S100 becomes NO, and thereby the present operation is terminated.

Figure 15:
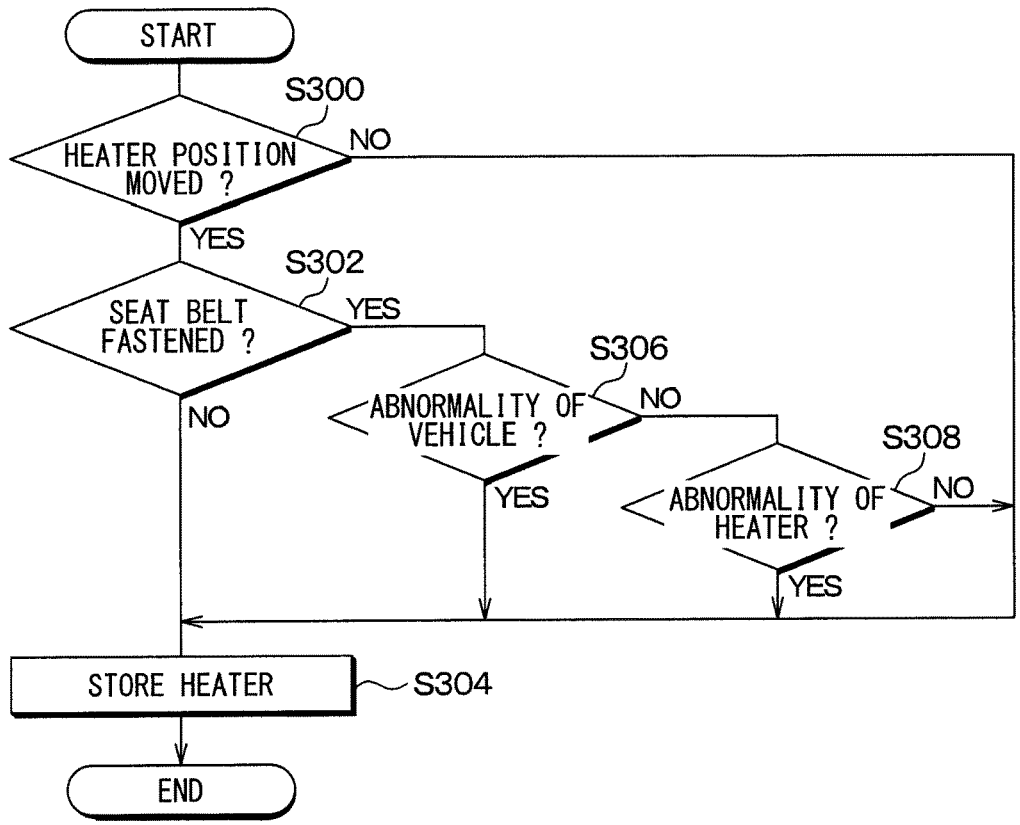
FIG. 15 is a flowchart of the heater ECU according to the second embodiment.

The heater ECU 50 of the present embodiment periodically executes a process of FIG. 15 in parallel with the process of FIG. 14. The heater ECU 50 places a higher priority on execution of the process of FIG. 15 than execution of the process of FIG. 14.

First of all, at S300, the heater ECU 50 determines whether the position of the heater main body 10 is moved. Specifically, it is determined whether the heater main body 10 is moved from the storing position, which is set at the lower surface of the glove box 82.

In a case where the heater main body 10 is moved from the storing position, which is set at the lower surface of the glove box 82, a result of the determination at S300 becomes YES. Thereby, at S302, the heater ECU 50 determines whether the seat belt is fastened. Specifically, it is determined whether the seal belt is fastened based on the seat belt fastening signal, which is outputted from the seat belt sensor (not shown).

Here, in a case where it is determined that the seat belt is unfastened at S302, a result of the determination at S302 becomes NO. Therefore, at next S304, the heater ECU 50 stores the heater main body 10 at the storing position, which is set at the lower surface of the glove box 82, and the present operation is terminated. Specifically, the actuator 43 of the moving mechanism 40 is driven such that the heater main body 10 is stored at the storing position, which is set at the lower surface of the glove box 82.

Furthermore, in a case where the seat belt is fasted, the result of the determination at S302 becomes YES. Therefore, at S306, the heater ECU 50 determines whether the abnormality of the vehicle (e.g., the brake abnormality, the vehicle collision) is sensed. Specifically, it is determined whether the abnormality of the vehicle is sensed based on the abnormality signal(s), which would be transmitted from the various ECUs of the vehicle upon occurrence of the abnormality.

Here, in a case where the heater main body 10 is displaced from the storing position, which is set at the lower surface of the glove box 82, and the abnormality signal(s) is outputted from the ECUs of the vehicle, a result of the determination at S306 becomes YES. Then, at S304, the heater ECU 50 stores the heater main body 10 at the storing position, which is set at the lower surface of the glove box 82.

Furthermore, in a case where the abnormality signal is not inputted from the various ECUs of the vehicle, the result of the determination at S306 becomes NO. Thus, at S308, the heater ECU 50 determines whether the abnormality of the heater main body 10 is present. Specifically, it is determined whether the abnormality of the heater main body 10 is present based on whether the abnormality of the heater unit 20 (e.g., the abnormal heat generation, the breaking of the conductive line, the sensing of the noise) is sensed with the abnormality sensing portion.

In a case where the heater main body 10 is displaced from the storing position, which is set at the lower surface of the glove box 82, and the abnormality is sensed with the abnormality sensing portion, a result of the determination at S308 becomes YES. Then, at S304, the heater ECU 50 stores the heater main body 10 at the storing position, which is set at the lower surface of the glove box 82.

In a case where the abnormality is not sensed with the abnormality sensing portion, the result of the determination at S308 becomes NO. Thus, the heater ECU 50 terminates the present operation without storing the heater main body 10 at the storing position, which is set at the lower surface of the glove box 82.

Furthermore, in a case where the heater main body 10 is not displaced from the storing position, which is set at the lower surface of the glove box 82, the result of the determination at S100 becomes NO. Thereby, the present operation is terminated.

In the present embodiment, advantages, which are achievable by the common structure that is common to the first embodiment, can be achieved like in the first embodiment.

Furthermore, there is provided the contact sensing layer 70, which senses the contact of the sensing subject to the heater main body 10. The sensed distance between the sensing subject and the heater main body can be specified based on the contact of the sensing subject to the heater main body 10, which is sensed with the contact sensing layer 70.

More specifically, there is provided the contact sensing layer 70 that is stacked over the heater unit 20 and senses the contact of the sensing subject to the heater main body 10 based on the value of resistance of the resistor 72, which changes in response to the change in the temperature of the heater unit 20. The sensed distance between the sensing subject and the heater main body can be specified based on the contact of the sensing subject to the heater main body 10, which is sensed with the contact sensing layer 70.

Furthermore, in the case where the contact of the sensing subject to the heater main body 10 is sensed with the contact sensing layer 70, the moving mechanism 40 can be controlled to move the heater main body 10 in the direction away from the position of the sensing subject. Therefore, it is possible to avoid the occurrence of the state where the sensing subject contacts the heater main body 10.

Furthermore, in the case where the contact of the sensing subject to the heater main body 10 is sensed with the contact sensing layer 70, the moving mechanism 40 is controlled to move the heater main body 10 in the direction for spacing the heater main body 10 away from the occupant by the predetermined distance. Thus, it is possible to maintain the state where the sensing subject and the heater main body 10 are spaced from each other by the predetermined distance.

Third Embodiment

Figure 16:
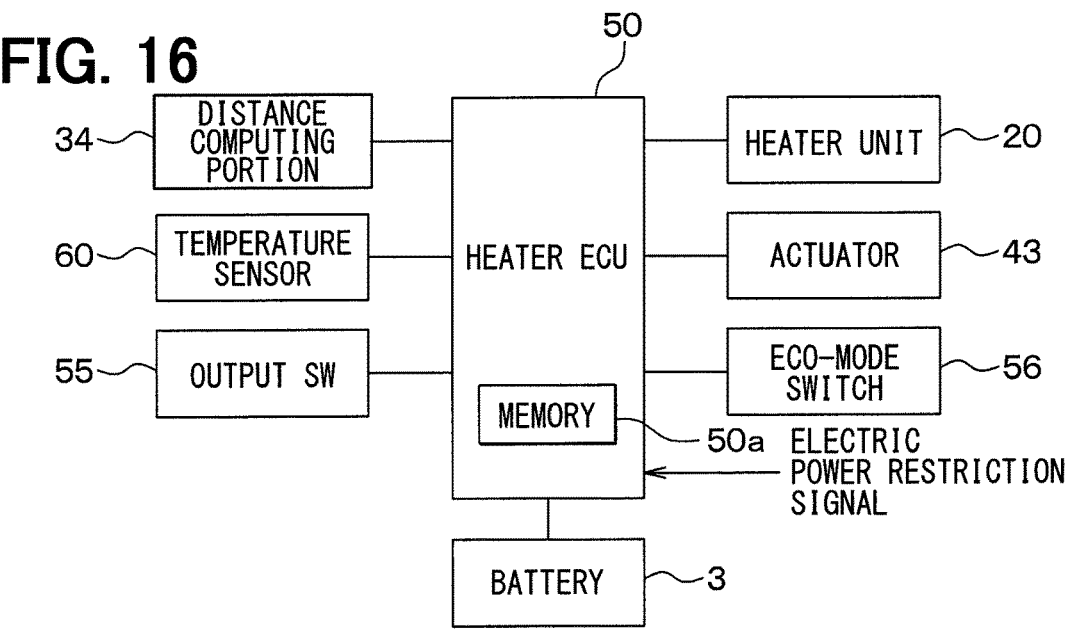
FIG. 16 is a block diagram of a heater device according to a third embodiment.

A structure of the heater device 1 according to a third embodiment of the present disclosure will be described with reference to FIG. 16. The heater device 1 of the present embodiment differs from the heater device 1 of the first embodiment with respect to provision of an ECO-mode switch 56 that enables setting of an electric power saving mode for limiting electric power consumption. When the ECO-mode switch 56 is manipulated by, for example, the occupant 81, a signal for setting the electric power saving mode is inputted to the heater ECU 50. Furthermore, in the case where the electric power saving mode is set, the amount of available electric power, which indicates the amount of electric power that can be consumed, is preset. The amount of available electric power is set to limit the amount of electric power consumption and is stored in the memory 50a of the heater ECU 50.

The heater device 1 of the present embodiment differs from the heater device 1 of the first embodiment with respect to the following point. Specifically, at the time of, for example, dropping of the voltage of the battery 3, a signal, which indicates the amount of available electric power that is the amount of electric power being available, is inputted to the heater ECU 50 of the heater device 1 from a battery monitoring ECU (not shown), which monitors the temperature and the voltage of the battery 3, along with an electric power restriction signal that indicates execution of restriction of the electric power consumption.

Figure 17:
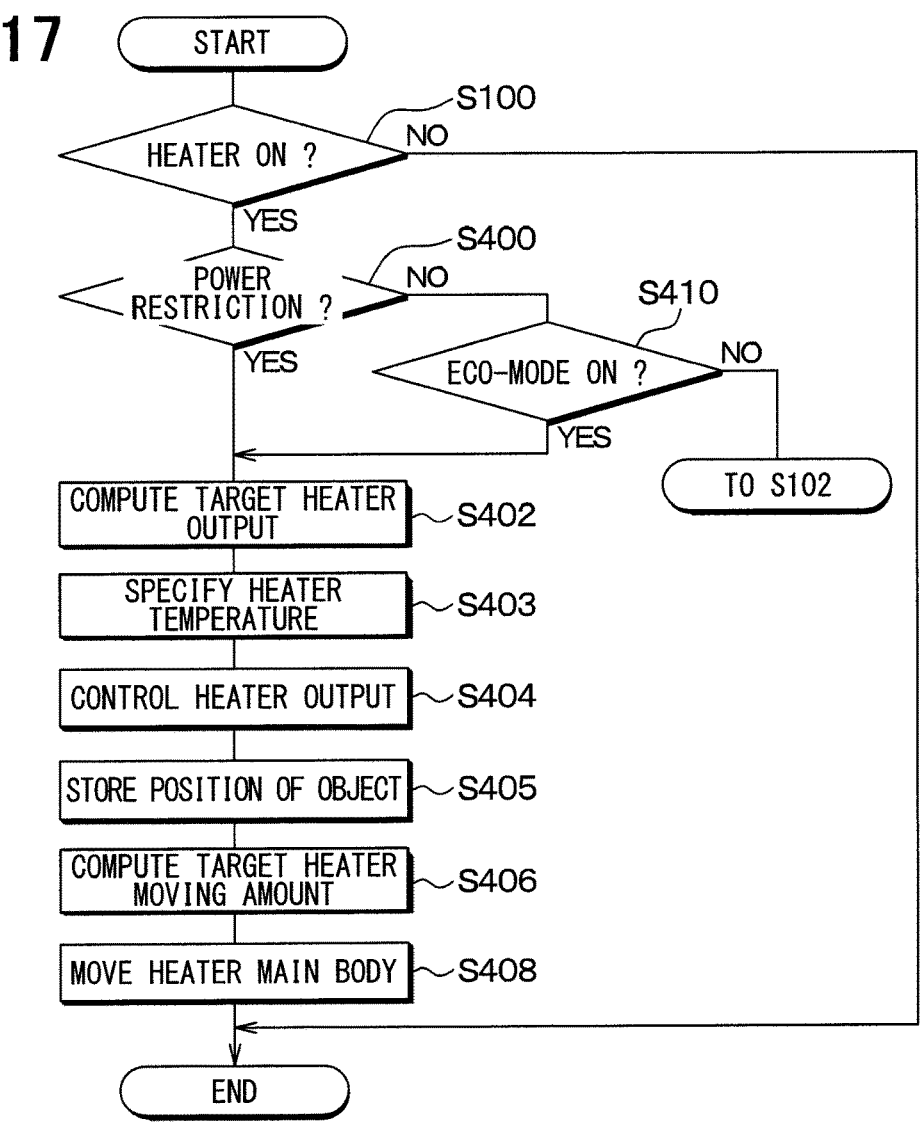
FIG. 17 is a flowchart of a heater ECU according to the third embodiment.

FIG. 17 is a flowchart of the heater ECU 50 of the present embodiment. The heater ECU 50 of the present embodiment periodically executes the process of FIG. 17.

First of all, at S100, the heater ECU 50 determines whether the ON-button of the on-off switch 551 is manipulated. In a case where the ON-button of the on-off switch 551 is manipulated, the result of the determination at S100 becomes YES. Thereby, at S400, the heater ECU 50 determines whether an electric power restriction is present at S400. Specifically, it is determined whether the electric power restriction is present based on whether the electric power restriction signal is inputted from the battery monitoring ECU.

Here, for example, in a case where the voltage of the battery 3 is dropped, and thereby the electric power restriction signal is inputted from the battery monitoring ECU, a result of the determination at S400 becomes YES. Therefore, at next S402, the heater ECU 50 computes the target heater output based on the amount of available electric power. Specifically, the amount of available power is specified based on the signal that is outputted from the battery monitoring ECU (not shown) and indicates the amount of available electric power. Then, the target heater temperature, i.e., the target heater output is computed based on this amount of available electric power through use of a predetermined equation(s).

Here, in a case where the electric power restriction signal is inputted, the heater ECU 50 computes the target heater temperature, i.e., the target heater output such that the target heater temperature is reduced in comparison to a case where the electric power restriction signal is not inputted.

At next S403, the heater ECU 50 specifies the heater temperature of the heater main body 10. This heater temperature can be specified based on the signal, which is inputted from the temperature sensor 60.

At next S404, the heater ECU 50 executes the heater output control operation. In the present embodiment, first of all, the target heater output, i.e., the target heater temperature of the heater unit 20 is specified in such a manner that the temperature of the heater unit 20, which is specified at S403, approaches the target heater temperature, which is computed at S402. Then, a pulse signal having a corresponding duty ratio, which can achieve this heater output, is outputted to the heater unit 20.

At next S405, the position of the occupant is specified, and the specified position of the occupant is stored in the RAM of the heater ECU 50. Specifically, a distance between the heater unit 20 and the occupant is specified based on the distance information that is outputted from the distance computing portion 34. Then, the specified distance between the heater unit 20 and the occupant is stored in the RAM of the heater ECU 50.

At next S406, the heater ECU 50 computes the target heater moving amount of the heater main body 10 based on the target heater output of the heater unit 20 and the position of the occupant. Specifically, the target heater moving amount of the heater main body 10 is computed through use of the map, which is stored in the memory 50a of the heater ECU 50, based on the target heater output, which is specified at S404, and the distance, which is between the heater unit 20 and the occupant and is specified based on the distance information outputted from the distance computing portion 34. This target heater moving amount is the moving amount of the heater main body 10 that is required to move the heater main body 10 to the predetermined target position by the moving mechanism 40. In the present embodiment, the target heater moving amount is computed such that the sensed distance between the heater main body 10 and the occupant reaches the target distance. Furthermore, the target heater moving amount is computed such that when the target heater output, i.e., the target heater temperature of the heater unit 20 is reduced, the distance between the heater main body 10 and the occupant is reduced, i.e., the heater main body 10 is placed closer to the occupant.

Furthermore, according to the present embodiment, in the case where the electric power restriction signal is inputted, the target heater moving amount is computed such that the distance between the heater main body 10 and the sensing subject is reduced in comparison to the case where the electric power restriction signal is not inputted.

At next S408, the heater ECU 50 moves the heater main body 10 until the target heater moving amount, which is computed at S406, is reached, and thereafter the heater ECU 50 returns to S100. In this way, the heater main body 10 is stopped at a corresponding position, at which the distance between the heater main body 10 and the occupant reaches the predetermined distance.

Furthermore, in the case where the electric power restriction signal is not inputted from the battery monitoring ECU, the result of the determination at S400 becomes NO. Therefore, at S410, the heater ECU 50 determines whether the ECO-mode switch 56 is in the ON state.

Here, in the case where the ECO-mode switch 56 is in the ON state, the result of the determination at S410 becomes YES. Thereby, the operation proceeds to S402. At the time of executing the electric power saving mode, at S402, the heater ECU 50 computes the target heater temperature, i.e., the target heater output based on the amount of available electric power that is stored in the memory 50a.

Here, in the case where the electric power saving mode is set, the heater ECU 50 computes the target heater temperature, i.e., the target heater output such that the target heater temperature is reduced in comparison to the target heater temperature that is set in the case where the electric power saving mode is not set.

At next S403, the heater ECU 50 specifies the heater temperature of the heater main body 10. Then, at S404, the heater ECU 50 executes the heater output control operation. At S405, the position of the occupant is specified, and the specified position of the occupant is stored in the RAM of the heater ECU 50.

At next S406, the heater ECU 50 computes the target heater moving amount of the heater main body 10 based on the target heater output of the heater unit 20 and the position of the occupant. Specifically, the target heater moving amount of the heater main body 10 is computed through use of the map, which is stored in the memory 50a of the heater ECU 50, based on the target heater output, which is specified at S404, and the distance, which is between the heater unit 20 and the occupant and is specified based on the distance information outputted from the distance computing portion 34.

Here, in the case where the electric power saving mode is set, the heater ECU 50 computes the target heater moving amount such that the distance between the heater main body 10 and the sensing subject is reduced in comparison to the case where the electric power saving mode is not set.

At next S408, the heater ECU 50 moves the heater main body 10 until the target heater moving amount, which is computed at S406, is reached, and thereafter the heater ECU 50 returns to S100. In this way, the heater main body 10 is stopped at a corresponding position, at which the distance between the heater main body 10 and the occupant reaches the predetermined distance.

In the case where the ECO-mode switch 56 is in the OFF state, the result of the determination at S410 becomes NO. Therefore, the operation proceeds to S102 of FIG. 10.

Furthermore, when the OFF-button of the on-off switch 551 is manipulated, the result of the determination at S100 becomes NO. Therefore, the present operation is terminated.

By repeating the above operation, in the case where, for example, the posture of the occupant is changed, or the occupant changes the seat position, the moving mechanism 40 is controlled such that the sensed distance between the heater main body 10 and the occupant reaches the target distance in conformity with, for example, the posture of the occupant. Then, the sensed distance between the heater main body 10 and the occupant is kept to the target distance.

In the present embodiment, advantages, which are achievable by the common structure that is common to the first embodiment, can be achieved like in the first embodiment.

Furthermore, in the above-described structure, in the case where the electric power restriction signal, which indicates the execution of the restriction of the electric power consumption based on the state of the battery 3, is inputted, the heater ECU 50 controls the moving mechanism 40 such that the distance between the heater main body 10 and the sensing subject is reduced in comparison to the case where the electric power restriction signal is not inputted. Furthermore, in the case where the electric power restriction signal is inputted, the heater ECU 50 reduces the amount of electric power supplied to the heater unit 20 in comparison to the case where the electric power restriction signal is not inputted. With the above configuration, it is possible to provide the good warm sensation to the occupant regardless of the further reduced electric power consumption.

Furthermore, with the above configuration, in the case where the electric power saving mode is set through the manipulation, the moving mechanism 40 is controlled such that the distance between the heater main body 10 and the sensing subject is reduced in comparison to the case where the electric power saving mode is not set. Furthermore, in the case where the electric power saving mode is set, the amount of electric power supplied to the heater unit 20 is reduced in comparison to the case where the electric power saving mode is not set. With the above configuration, it is possible to provide the good warm sensation to the occupant regardless of the further reduced electric power consumption.

Furthermore, in the case where the amount of available electric power is restricted, the target heater output of the heater unit is specified based on the amount of available electric power, and the moving mechanism 40 may be controlled such that the distance between the sensing subject and the heater main body is changed according to this target heater output.

In the present embodiment, advantages, which are achievable by the common structure that is common to the first embodiment, can be achieved like in the first embodiment.

Other Embodiments

The present disclosure should not be limited to the above embodiments and may be embodied in various forms based on the scope of the present disclosure.

(1) In the first embodiment, at S110, the moving amount, i.e., the target moving amount of the heater main body 10 is computed such that when the target heater output of the heater unit 20 is increased, the distance between the sensing subject and the heater main body 10 is reduced. Alternatively, the moving amount, i.e., the target moving amount of the heater main body 10 may be computed such that when the target heater output of the heater unit 20 is reduced, the distance between the sensing subject and the heater main body 10 is reduced. With this configuration, the good warm sensation can be provided to the occupant at the further reduced electric power consumption.

(2) In the first and third embodiments, the distance between the heater main body 10 and the sensing subject is specified through the distance sensing layer 30, which is the capacitance sensor. Here, the distance between the heater main body 10 and the sensing subject may be specified by using at least one of an electromagnetic induction sensor, an ultrasonic sensor, a photoelectric sensor and a magnetic sensor.

(3) In the above respective embodiments, the distance specifying portion, which specifies the position of the sensing subject, is formed by the distance sensing layer 30 and the contact sensing layer 70. Here, for example, there may be provided a seat position sensor that outputs a signal, which indicate a seat position of the seat of the occupant in a front-to-rear direction of the vehicle, a height of the seat and an angle of the seat. The body size and the posture of the sensing subject, i.e., the occupant who is present on the seat may be estimated based on the signal that is outputted from the seat position sensor. In such a case, the distance between the heater main body 10 and the sensing subject, i.e., the occupant may be specified based on the estimated body size and the estimated posture of the sensing subject, i.e., the occupant.

(4) In the second embodiment, the contact of the sensing subject to the heater main body 10 is sensed based on the change in the value of resistance of the PTC layer 72 at the contact sensing layer 70. Here, the actuator 43 of the moving mechanism 40 may include a torque sensor that senses a torque exerted at the actuator 43. The contact of the sensing subject to the heater main body 10 may be sensed based on sensing of a torque, which is applied to the actuator 43 and is equal to or larger than a predetermined torque, through the torque sensor. In such a case, the heater ECU 50 drives the actuator 43 of the moving mechanism 40 to move the heater main body 10 toward the occupant. In a case where the application of the torque, which is equal to or larger than a reference value, to the actuator 43 is sensed through the torque sensor, the driving of the actuator 43 may be stopped, and then the actuator 43 may be driven such that the heater main body 10 is moved for a predetermined distance in a direction that is opposite from the previous moving direction. As discussed above, when the contact of the sensing subject to the heater main body 10 is sensed through the torque sensor installed to the actuator 43, the contact of the sensing subject to the heater main body 10 can be sensed with the simple structure.

(5) In the first and second embodiments, the storage device of the heater ECU 50 stores the map that indicates the relationship among the target heater output of the heater unit 20, the sensed distance between the heater main body 10 and the sensing subject, and the heater moving amount of the heater main body 10. Here, for example, the storage device of the heater ECU 50 may store an equation as the map while the equation is for computing the heater moving amount of the heater main body 10 based on the target heater output of the heater unit 20 and the sensed distance between the heater main body 10 and the sensing subject.

(6) In the above respective embodiments, there is discussed about the exemplary case where the heater device 1 of the present disclosure is installed to the vehicle (automobile). However, the installation of the heater device 1 of the present disclosure should not be limited to the above described type of vehicle. For example, the heater device 1 of the present disclosure may be installed to a cabin of another type of vehicle, such as a ship, an aircraft, or a room of a building fixed to a land.

(7) In the above respective embodiments, the heater device 1 is installed to the glove box of the vehicle. Here, the heater unit 20 may be provided to, for example, an instrument panel, a back surface of the seat, on which the occupant is seated, a steering column for supporting a steering wheel, a door trim, a center console, a ceiling, or a sun visor.

(8) In the first embodiment, the moving mechanism 40 is constructed to move the heater main body 10 in generally parallel with the lower limbs of the occupant. Here, an extendible arm, which is extendible in response to a control operation of the heater ECU 50, may be provided to each of four corners of the heater main body 10. The heater main body 10 may be moved to place the heater main body 10 in parallel with the lower limbs of the occupant by extending/contracting the extendible arms. For example, a distance of the heater main body 10 relative to a plurality of positions of the sensing subject may be specified, and the heater main body 10 may be moved such that the distances, each of which is measured between the heater main body 10 and a corresponding one of the positions of the sensing subject, become equal to each other. With this configuration, the temperature variations at the lower limbs of the occupant are reduced, and thereby it is possible to provide the more comfortable warm sensation to the occupant.

(9) In each of the first and third embodiments, the distance sensing layer 30, which serves as a position specifying portion, is provided in the inside of the heater main body 10. In the second embodiment, the contact sensing layer 70, which serves as the position specifying portion, is provided in the inside of the heater main body 10. Here, the position specifying portion may be provided at an outside of the heater main body 10.

(10) In the second embodiment, the process shown in FIG. 15 is executed in parallel with the flowchart shown in FIG. 14. Alternatively, the process shown in FIG. 15 may be executed in parallel with the flowchart shown in FIG. 10 or the flowchart shown in FIG. 17.

(11) In the above embodiments, the heater, which radiates the radiant heat upon generating the heat through the energization, is used as the example of the heater device 1. However, the heater device 1 of the present disclosure should not be limited to this structure. Specifically, for example, the heater device 1 may be formed by a heater core. The heater core is a heat radiating device for heating the vehicle cabin while the heater core has tubes and fins and exchanges heat between engine coolant, which is conducted in the tubes, and the air.

The present disclosure should not be limited to the above embodiments. The above embodiments are not necessarily unrelated to each other and can be combined in an appropriate manner unless such a combination is obviously impossible. Furthermore, in the above respective embodiments, it should be understood that the components are not necessarily indispensable except a case where the components are expressly stated as indispensable and a case where the components are regarded as indispensable in view of the principle. Furthermore, in the above embodiments, in the case where the material of the component(s), the shape of the component(s), and/or the positional relationship of the component(s) are specified, the present disclosure should not be limited to the material of the component(s), the shape of the component(s), and/or the positional relationship of the component(s) unless the embodiment specifically states that the material of the component(s), the shape of the component(s), and/or the positional relationship of the component(s) is necessary, or the embodiment states that the present disclosure is limited in principle to the material of the component(s), the shape of the component(s), and/or the positional relationship of the component(s) discussed above.

The memory 50a described above is a non-transitory tangible storage medium.

What is claimed is:

1. A heater device comprising:
    a heater main body that includes a heater unit, which generates heat;
    a distance specifying portion that specifies a distance between a sensing subject and the heater main body as a sensed distance;
    an actuator that moves the heater main body;
    a heater position control portion that controls the actuator such that the distance between the sensing subject and the heater main body is adjusted to a target distance based on the sensed distance, which is specified by the distance specifying portion; and
    an output specifying portion that specifies a target heater output of the heater unit based on a predetermined heater output level, wherein the heater position control portion controls the actuator such that the distance between the sensing subject and the heater main body is changed according to the target heater output, which is specified by the output specifying portion.

2. The heater device according to claim 1, wherein the heater unit generates the heat when an electric power is supplied to the heater unit.

3. The heater device according to claim 2, comprising a heater control portion that controls an amount of electric power supplied to the heater unit, wherein:
    the heater position control portion controls the actuator such that the distance between the heater main body and the sensing subject is reduced in a case where an electric power restriction signal indicating restriction of an electric power consumption based on a state of a battery is inputted in comparison to a case where the electric power restriction signal is not inputted; and
    the heater control portion reduces the amount of electric power supplied to the heater unit in the case where the electric power restriction signal is inputted in comparison to the case where the electric power restriction signal is not inputted.

4. The heater device according to claim 2, comprising a heater control portion that controls an amount of electric power supplied to the heater unit, wherein:
    in a case where an electric power saving mode is set through manipulation, the heater position control portion controls the actuator such that the distance between the heater main body and the sensing subject is reduced in comparison to a case where the electric power saving mode is not set; and
    in the case where the electric power saving mode is set, the heater control portion reduces the amount of electric power supplied to the heater unit in comparison to the case where the electric power saving mode is not set.

5. The heater device according to claim 1, wherein the heater unit radiates radiant heat.

6. The heater device according to claim 1, wherein the heater position control portion controls the actuator such that the distance between the sensing subject and the heater main body is decreased when the target heater output, which is specified by the output specifying portion, is increased.

7. The heater device according to claim 1, comprising a storage device that stores a map indicating a relationship among:
- the target heater output;
- the sensed distance, which is specified by the distance specifying portion; and
- a heater moving amount of the heater main body that is moved by the actuator.

8. The heater device according to claim 1, the distance specifying portion is constructed by using at least one of a capacitive sensor, an electromagnetic induction sensor, an ultrasonic sensor, a photoelectric sensor, and a magnetic sensor.

9. The heater device according to claim 1, wherein:
the heater unit generates the heat when an electric power is supplied to the heater unit;
the heater device comprising:
- a second output specifying portion that specifies the target heater output of the heater unit based on an amount of available electric power in a case where the amount of available electric power is restricted; and
- the heater position control portion controls the actuator such that the distance between the sensing subject and the heater main body is changed according to the target heater output that is specified by the second output specifying portion.

10. The heater device according to claim 1, wherein:
the distance specifying portion includes a contact sensing portion that senses contact of the sensing subject to the heater main body; and
the distance specifying portion specifies the sensed distance between the sensing subject and the heater main body based on the contact of the sensing subject to the heater main body, which is sensed by the contact sensing portion.

11. The heater device according to claim 10, wherein the contact sensing portion includes a contact sensing layer that is formed to be stacked over the heater unit and senses the contact of the sensing subject to the heater main body according to a value of resistance of a resistor of the contact sensing layer while the value of resistance of the resistor changes according to a change in a temperature of the heater unit.

12. The heater device according to claim 10, wherein:
the actuator is an electromechanical actuator that moves the heater main body; and
the contact sensing portion senses the contact of the sensing subject to the heater main body when a torque, which is equal to or larger than a reference value, is applied to the actuator.

13. The heater device according to claim 10, wherein when the contact of the sensing subject to the heater main body is sensed by the contact sensing portion, the heater position control portion controls the actuator such that the heater main body is moved in a direction away from a position of the sensing subject.

14. The heater device according to claim 13, wherein the heater position control portion controls the actuator such that the heater main body is moved in the direction away from the position of the sensing subject and is spaced from the position of the sensing subject by a predetermined distance.

15. The heater device according to claim 1, comprising a storing portion that controls the actuator to store the heater main body to a predetermined storing position in at least one of:
- a case where unfastening of a seat belt of an occupant is sensed;
- a case where an abnormality of a vehicle is sensed; and
- a case where an abnormality of the heater main body is sensed.

16. The heater device according to claim 1, wherein the heater device is installed to at least one of:
- an instrument panel of a vehicle;
- a glove box of the vehicle;
- a back surface of a seat, on which an occupant is seated;
- a steering column that supports a steering wheel of the vehicle;
- a door trim of the vehicle;
- a center console of the vehicle;
- a ceiling of the vehicle; and
- a sun visor of the vehicle.

17. The heater device according to claim 1, wherein the heater position control portion controls the actuator such that the heater main body is positioned in parallel with the sensing subject.

18. A heater device comprising:
- a heater main body that includes a heater unit, which generates heat when an electric power is supplied to the heater unit;
- a distance specifying portion that specifies a distance between a sensing subject and the heater main body as a sensed distance;
- an actuator that moves the heater main body;
- a heater position control portion that controls the actuator such that the distance between the sensing subject and the heater main body is adjusted to a target distance based on the sensed distance, which is specified by the distance specifying portion; and
- a heater control portion that controls an amount of electric power supplied to the heater unit, wherein:
the heater position control portion controls the actuator such that the distance between the heater main body and the sensing subject is reduced in a case where an electric power restriction signal indicating restriction of an electric power consumption based on a state of a battery is inputted in comparison to a case where the electric power restriction signal is not inputted; and
the heater control portion reduces the amount of electric power supplied to the heater unit in the case where the electric power restriction signal is inputted in comparison to the case where the electric power restriction signal is not inputted.

19. A heater device comprising:
- a heater main body that includes a heater unit, which generates heat when an electric power is supplied to the heater unit;
- a distance specifying portion that specifies a distance between a sensing subject and the heater main body as a sensed distance;
- an actuator that moves the heater main body;
- a heater position control portion that controls the actuator such that the distance between the sensing subject and the heater main body is adjusted to a target distance based on the sensed distance, which is specified by the distance specifying portion; and a heater control portion that controls an amount of electric power supplied to the heater unit, wherein:

in a case where an electric power saving mode is set through manipulation, the heater position control portion controls the actuator such that the distance between the heater main body and the sensing subject is reduced in comparison to a case where the electric power saving mode is not set; and in the case where the electric power saving mode is set, the heater control portion reduces the amount of electric power supplied to the heater unit in comparison to the case where the electric power saving mode is not set.

20. A heater device comprising:

a heater main body that includes a heater unit, which generates heat when an electric power is supplied to the heater unit;

a distance specifying portion that specifies a distance between a sensing subject and the heater main body as a sensed distance;

an actuator that moves the heater main body;

a heater position control portion that controls the actuator such that the distance between the sensing subject and the heater main body is adjusted to a target distance based on the sensed distance, which is specified by the distance specifying portion;

a first output specifying portion that specifies a target heater output of the heater unit based on a predetermined heater output level; and a second output specifying portion that specifies the target heater output of the heater unit based on an amount of available electric power in a case where the amount of available electric power is restricted, wherein:

the heater position control portion controls the actuator such that the distance between the sensing subject and the heater main body is changed according to the target heater output that is specified by the second output specifying portion.

21. A heater device comprising:

a heater main body that includes a heater unit, which generates heat;

a distance specifying portion that specifies a distance between a sensing subject and the heater main body as a sensed distance;

an actuator that moves the heater main body; and a heater position control portion that controls the actuator such that the distance between the sensing subject and the heater main body is adjusted to a target distance based on the sensed distance, which is specified by the distance specifying portion, wherein:

the distance specifying portion includes a contact sensing portion that senses contact of the sensing subject to the heater main body;

the distance specifying portion specifies the sensed distance between the sensing subject and the heater main body based on the contact of the sensing subject to the heater main body, which is sensed by the contact sensing portion; and the contact sensing portion includes a contact sensing layer that is formed to be stacked over the heater unit and senses the contact of the sensing subject to the heater main body according to a value of resistance of a resistor of the contact sensing layer while the value of resistance of the resistor changes according to a change in a temperature of the heater unit.

\* \* \* \* \*